United States Patent
Morikawa

(10) Patent No.: US 11,863,726 B2
(45) Date of Patent: Jan. 2, 2024

(54) PRINTING DEVICE, CONTROL METHOD, AND NON-TRANSITORY COMPUTER-READABLE RECORDING MEDIUM THEREFOR UTILIZING DIFFERING CALIBRATION PATCH CONFIGURATIONS ON THE SAME PRINTING MEDIUM

(71) Applicant: Brother Kogyo Kabushiki Kaisha, Nagoya (JP)

(72) Inventor: Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/048,881

(22) Filed: Oct. 24, 2022

(65) Prior Publication Data
US 2023/0171366 A1  Jun. 1, 2023

(30) Foreign Application Priority Data
Nov. 26, 2021  (JP) .................... 2021-192303

(51) Int. Cl.
*H04N 1/60*  (2006.01)
(52) U.S. Cl.
CPC ......... *H04N 1/6033* (2013.01); *H04N 1/6016* (2013.01)

(58) Field of Classification Search
CPC ............... H04N 1/6016–6033; H04N 1/6047
See application file for complete search history.

(56) References Cited

U.S. PATENT DOCUMENTS 9,860,423 B2 *  1/2018  Katsuyama ............ B41J 2/2054

FOREIGN PATENT DOCUMENTS

JP  2013-198079 A  9/2013

* cited by examiner

*Primary Examiner* — Barbara D Reinier
(74) *Attorney, Agent, or Firm* — BURR PATENT LAW, PLLC

(57) ABSTRACT

A printing device comprises a head configured to print an image having a plurality of pixels on a printing medium based on image data, an input device configured to obtain an input of designating a pixel of the image, and a controller. The controller is configured to cause the printing device to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

11 Claims, 10 Drawing Sheets

| | COLOR VALUE | | | POSITION | | INTER-POSITION DISTANCE | PRIORITY |
|---|---|---|---|---|---|---|---|
| No | R | G | B | x | y | | |
| 0 | 255 | 160 | 80 | x0 | y0 | 0 | 1 |
| 1 | 255 | 160 | 32 | x1 | y1 | | — |
| 2 | 255 | 176 | 80 | x2 | y2 | 9 | 3 |
| 3 | 255 | 144 | 80 | x3 | y3 | 4 | 2 |
| | | | | | | | |

FIG. 8

PRINTING DEVICE, CONTROL METHOD, AND NON-TRANSITORY COMPUTER-READABLE RECORDING MEDIUM THEREFOR UTILIZING DIFFERING CALIBRATION PATCH CONFIGURATIONS ON THE SAME PRINTING MEDIUM

REFERENCE TO RELATED APPLICATIONS

This application claims priority from Japanese Patent Application No. 2021-192303 filed on Nov. 26, 2021. The entire content of the priority application is incorporated herein by reference.

BACKGROUND ART

The present disclosures relate to a printing device, a control method of the printing device, and a non-transitory computer-readable recording medium containing computer-executable instructions realizing the control method.

Conventionally, color printing devices have been known. One of such conventional color printing devices is configured to print a plurality of particular color patches on a printing medium, measure the printed color patches, and obtain a plurality of colorimetric values. The printing device then extracts a color patch of a colorimetric value that is close to the color of a pixel in the image data for printing from among the plurality of colorimetric values, and converts the color of the image data for printing based on the colorimetric value of the extracted color patch.

DESCRIPTION

The above-mentioned color printing device is configured to calibrate the colors of image data for printing based on the colorimetric values of a particular color patch. However, for images with small color differences between pixels, such as images with color gradations, there is a concern that a given color patch may not be able to properly calibrate the colors of the image.

In view of the above situation, purpose of the present disclosures is to provide a printing device, a control method thereof, and a non-transitory computer-readable printing medium containing computer-executable instructions realizing a program that can improve the color calibration of images.

According to aspects of the present disclosures, there is provided a printing device, comprising a head configured to print an image having a plurality of pixels on a printing medium based on image data, an input device configured to obtain an input of designating a pixel of the image, and a controller. The controller is configured to cause the printing device to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

According to aspects of the present disclosures, there is also provided a control method of controlling a printing device, the printing device having a head configured to print an image having a plurality of pixels on a printing medium based on image data, and an input device configured to obtain an input of designating a pixel of the image. The control method comprising causing the printing device to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

According to aspects of the present disclosures, there is also provided a non-transitory computer-readable recording medium for a computer, the computer having a head configured to print an image having a plurality of pixels on a printing medium based on image data, and an input device configured to obtain an input of designating a pixel of the image, the non-transitory computer-readable recording medium containing computer-readable instructions causing, when executed by a controller of the computer, the computer to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

FIG. 1 schematically shows a top view of a printing device according to the present disclosures.

FIG. 8 shows a table in which colorimetric values of respective pixels, inter-position distances, and priorities.

Hereinafter, referring to the accompanying drawings, an embodiment of the present disclosure will be given concretely. In the following description, identical or equivalent elements will be assigned with the same reference numbers/symbols throughout all the drawings, and their redundant explanations will be omitted.

Configuration of Printing Device

Figure 1:
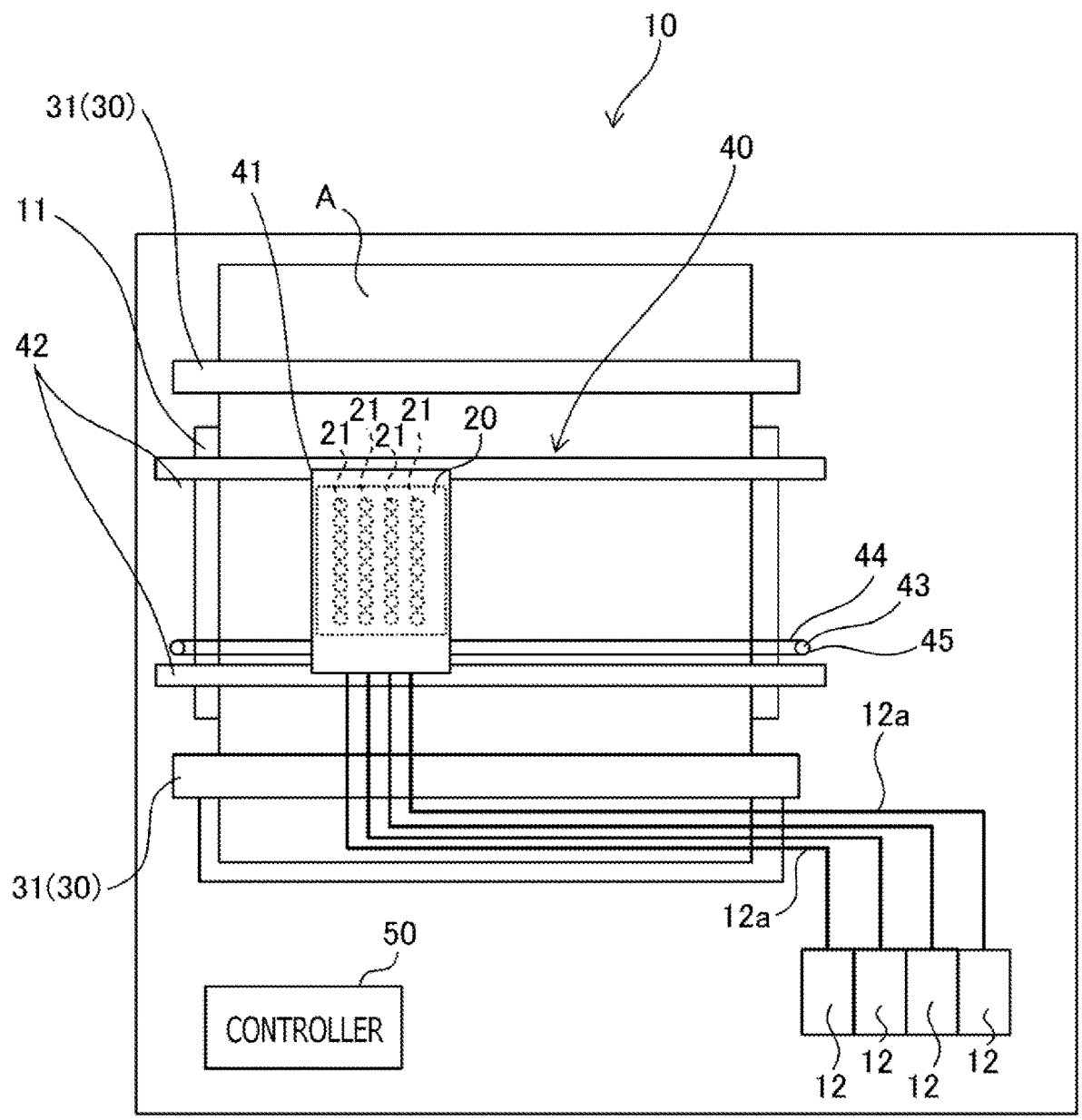
Figure 2:
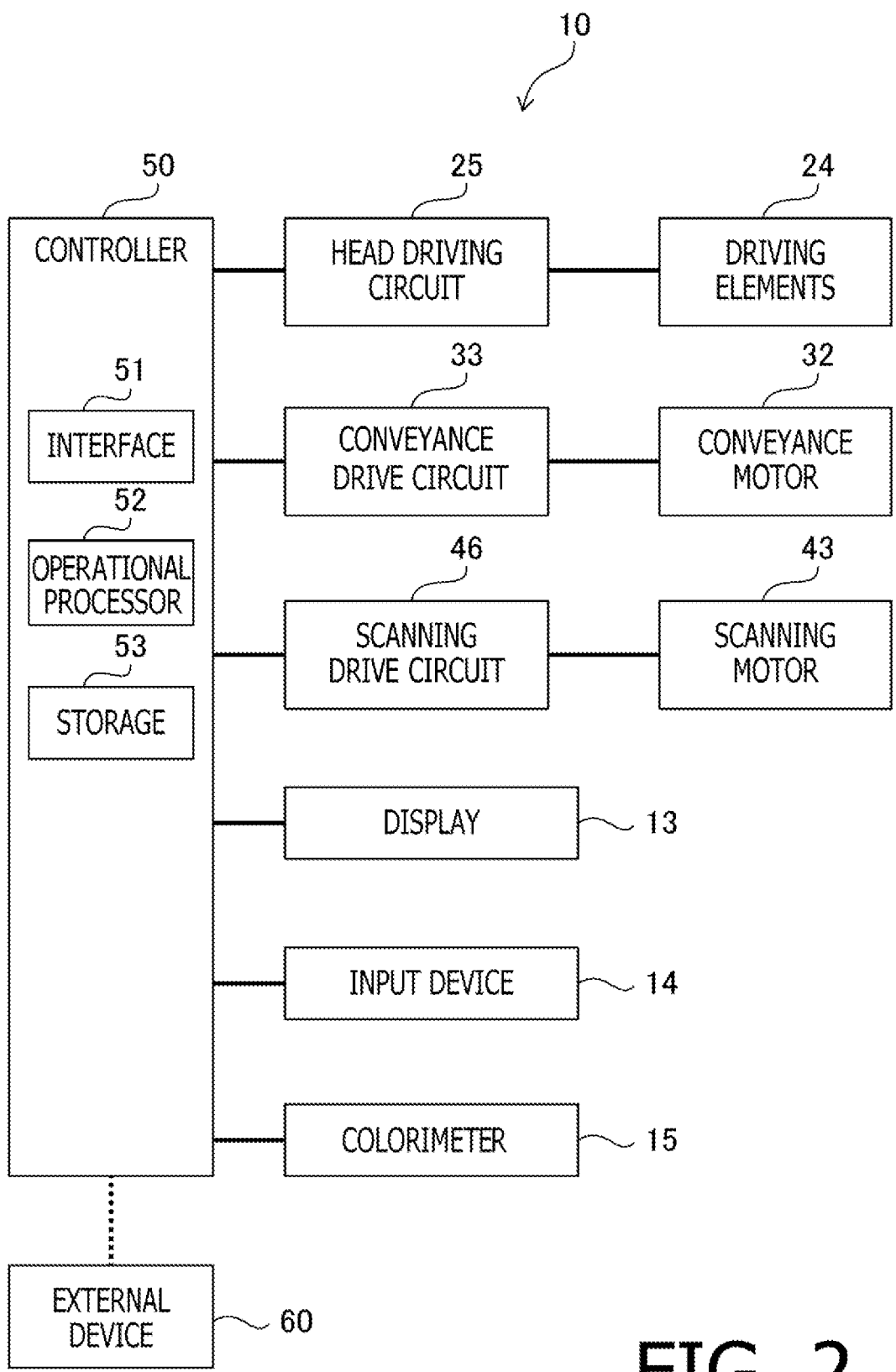
FIG. 2 is a block diagram illustrating a functional configuration of the printing device.

As shown in FIGS. 1 and 2, a printing device 10 according to a present embodiment is a device configured to print an image E on a printing medium A by ejecting ink from nozzles 21 of a head 20. In the following description, the printing device 10 is described as an example of an inkjet printer, but the printing device 10 is not necessarily limited to the inkjet printer. Further, the printing medium A is a sheet such as paper, cloth or the like.

The printing device 10 employs a so-called serial head type and includes a head 20, a platen 11, a tank 12, a display 13, an input device 14, a colorimeter 15, a conveyance device 30, a scanning device 40, and a controller 50. A direction in which the printing media A is conveyed by the conveyance device 30 will be referred to as a front-rear direction. A direction that intersects (e.g., orthogonally) with the front-rear direction and intersects (e.g., orthogonally) with each other will be referred to as a right-left direction and an up-down direction, respectively. It is noted, however, that an arrangement of the printing device 10 is not necessarily limited to the above. Further, the printing device 10 may employ a line head type. In such a case, the printing device 10 may not be provided with the scanning device 40, while a length of the head 20 may be longer than a length of the printing medium A in the right-left direction.

The head 20 has a plurality of nozzles 21 and a plurality of driving elements 24. The nozzles 21 are opened on a bottom surface of the head 20. The driving elements 24 are piezoelectric elements, exothermic elements, electrostatic actuators, or the like, which are provided at respective nozzles 21 and apply pressures to the ink to eject ink from the nozzles 21. The platen 11 has a planar upper surface and defines a distance between the printing medium A placed on the upper surface and the lower surface of the head 20, which is provided to face the printing medium A placed on the platen 11. The number of tanks 12 is equal to the number of ink types, which is, for example, four. The four tanks 12 store cyan ink, yellow ink, magenta ink, and black ink, respectively. Each tank 12 is connected to the head 20 by a tube 12a, and ink is supplied to the nozzles 21 of the head 20 through the tube 12a.

The conveyance device 30 has, for example, two conveyance rollers 31 and a conveyance motor 32. The two conveyance rollers 31 are arranged with the platen 11 being arranged therebetween in the front-rear direction. The conveyance roller 31 has a shaft extending in the right-left direction and is connected to the conveyance motor 32. The conveyance roller 31 is configured to be driven by a conveyance motor 32 to rotate around its axis and convey the printing medium A in the front-rear direction on the platen 11.

The scanning device 40 has a carriage 41, two guide rails 42, a scanning motor 43, and an endless belt 44. The carriage 41 is configured to mount the head 20 and is movably supported by the two guide rails 42 so as to reciprocally move in the right-left direction. The two guide rails 42 extend in the right-left direction above the platen 11 so as to sandwich the head 20 therebetween in the front-rear direction. The endless belt 44 extends in the right-left direction, and is connected to the scanning motor 43 via pulleys 45. The carriage 41 is secured to the endless belt 44. When the scanning motor 43 is driven, the endless belt 44 runs, and the carriage 41 moves reciprocally along the guide rail 4. In this way, the carriage 41 moves the head 20 in the right-left direction.

Controller, Display, Input Device and Colorimetric Device

As shown in FIG. 2, the controller 50 is, for example, a computer, equipped with an interface 51, an operational processor 52 and a storage 53. The interface 51 obtains various data such as image data and target color data from an external device 60 such as a computer, a camera, a communication network, a recording medium, a display or a printer. The image data is, for example, raster data, which represents the image E to be printed on the printing medium A. The controller 50 may be composed by a single device, or a plurality of devices may be dispersed and configured to cooperate with each other to operate as the printing device 10.

The storage 53 is a memory accessible from the operational processor 52, and includes a RAM and a ROM. The RAM temporarily stores various data such as image data and data converted by the operational processor 52. The ROM stores programs and tables for various data processing. The program may be stored in an external storage medium, such as a CD-ROM, different from the storage 53 and accessible from the operational processor 52.

The operational processor 52 includes a processor, such as a CPU, or a circuit. The circuit is, for example, an integrated circuit, such as an ASIC. The operational processor 52 controls each component of the printing device 10 by executing a program and performs various operations such as printing. The various operations will be described later.

The controller 50 thus configured is electrically connected to the display 13, the input device 14, and the colorimeter 15. The display 13 is, for example, an LCD, which is configured to display the image E to be printed by the printing operation. The input device 14 includes, for example, a mouse and a touchscreen panel, which are operated by the user to input data to the controller 50. The colorimeter 15 is, for example, a spectrophotometer, which is configured to measure colors in the image E on the printing medium A and input the measured color to the controller 50.

The controller 50 is electrically connected to the conveyance motor 32 of the conveyance device 30 via a conveyance drive circuit 33, and controls the driving of the conveyance motor 32. In this way, the conveyance of the printing medium A by the conveyance device 30 is controlled. Furthermore, the controller 50 is electrically connected to the scanning motor 43 of the scanning device 40 via a scanning drive circuit 46 and controls the driving of the scanning motor 43. In this way, the movement of the head 20 by the scanning device 40 is controlled.

The controller 50 is electrically connected to the driving elements 24 via a head driving circuit 25. The controller 50 outputs the control signal of the driving elements 24 to the head driving circuit 25, and the head driving circuit 25 generates the driving signal based on the control signal and output the driving signal to each of the driving elements 24. The driving elements 24 are driven by the driving signals, thereby ink being output from the nozzles 21.

Printing Operation

In the printing device 10 configured as described above, the controller 50 obtains image data and performs printing operations based on the image data. For example, the controller 50 moves the head 20 to the right or left while ejecting ink from the head 20 onto the printing medium A. The controller 50 then conveys the print medium A forward. In this way, the printing device 10 alternately repeats (1) the movement of the head 20 and the discharge of ink, and (2) the conveyance of the print medium A, thereby proceeding with the printing operation to print an image E on the printing medium A with ink.

Controlling Method of Printing Device

Figure 3:
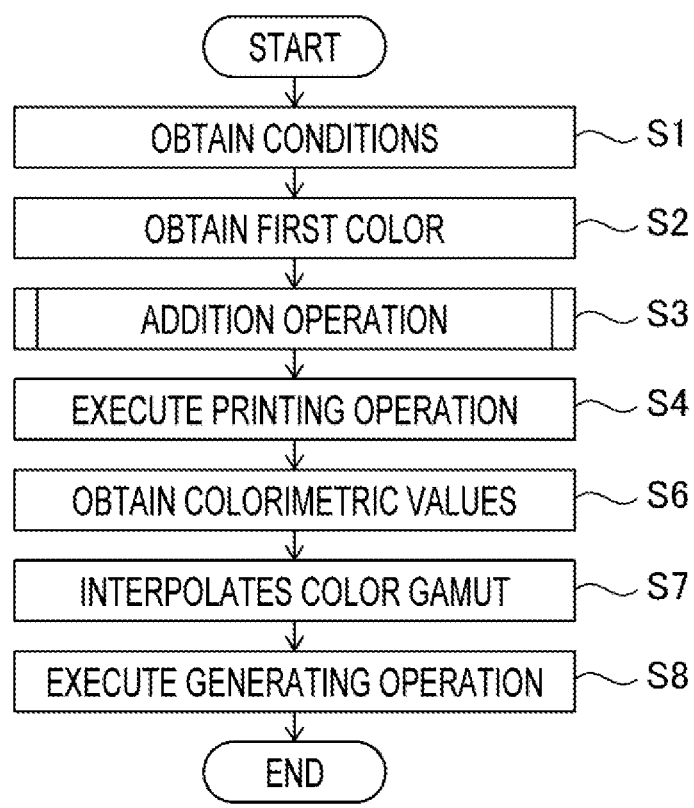
FIG. 3 is a flowchart illustrating a controlling method for the printing device.

The control of the printing device 10 is performed by the controller 50, for example, according to a flowchart in FIG. 3, which shows an example of a control method.

In S1 of FIG. 3, the controller 50 obtains conditions for a color calibration. The conditions include, for example, a size or type of the printing medium A for printing a patch, and a size of the patch to be printed.

The size of the printing medium A may be, for example, an A4 size (210 mm×297 mm) or a B5 size (182 mm×257 mm). The type of the printing medium A may be, for example, a T-shirt or a towel. The size or type of printing medium A and the size of the print area A1 on the printing medium A are associated in advance and stored in the storage 53. Based on this relationship, the controller 50 obtains the size of the print area A1 from the size or type of the printing medium A. The patch has a particular shape, such as a rectangle, and a particular size. The size of the patch is defined in such a manner that the color can be measured by the colorimeter 15. The size of the patch may be input to the controller 50 by the input device 14 or other means. Alternatively, the size of the patch may be determined in advance according to the resolution of the colorimeter 15.

In S2, the controller 50 obtains a first color which is a color of a first patch group B. The first patch group B includes a plurality of first patches bn of which color differences thereamong are equal to or greater than a particular threshold. The first color is pre-defined in the color list, and the color list is stored in a storage 53. The first color is a color that represents a stepwise color gamut, a area of color that can be reproduced by the printing device 10, and has device-dependent color coordinates, for example, RGB values in the RGB color space. For example, the first color represents the color gamut of the printing device 10, such as RGB values (0, 0, 0) through RGB values (255, 255, 255), in predetermined increments, for example 32 increments, and includes $(256/32+1)^3=729$ different colors. In this case, n is a natural number from 1 to 729 in the first patch bn, and the first patch group B has 729 different first patches bn, that is, first patches b1-b729.

The 729 kinds of first colors are provided for each color difference of a particular threshold. Among color differences of two first colors, the smallest color difference is the particular threshold. The particular color difference has a value greater than zero, and the 729 types of first colors have colors which are different from each other. The color difference is a difference of a color value and another color value. The color difference is expressed in terms of inter-color distance, which is a distance between two color coordinates when RGB values are expressed in color coordinates in the RGB color space composed of a linear three-dimensional space of R, G, and B axes. The greater the color difference in two colors, the greater the inter-color distance between the two RGB values and the easier it is to distinguish between the two colors.

In S3, the controller 50 performs an addition operation to add a second color, which is the color of the second patch group C, to the color list. The second patch group C is a group of patches including the patch corresponding to the designated pixel e1 described below, and has a pair of second patches cm having a smaller color difference than the pair of first patches bn of the first patch group B having the smallest color difference. The subscript m in the second patch cm is a natural number from 1 to the number of colors added by the addition operation. The second color is a color that represents the color gamut of the printing device 10 in steps and has color values such as RGB values. Among color differences of two second colors, the smallest color difference is greater than zero and less than a particular threshold, for example, half the particular threshold. The plurality of second colors are different from each other. In other words, the second patch group C includes a patch corresponding to the designated color, which is the color of a designated pixel e1, and a patch with a color of which the color difference from the designated color of the designated pixel e1 is greater than 0 and less than a particular threshold value.

Figure 4A:
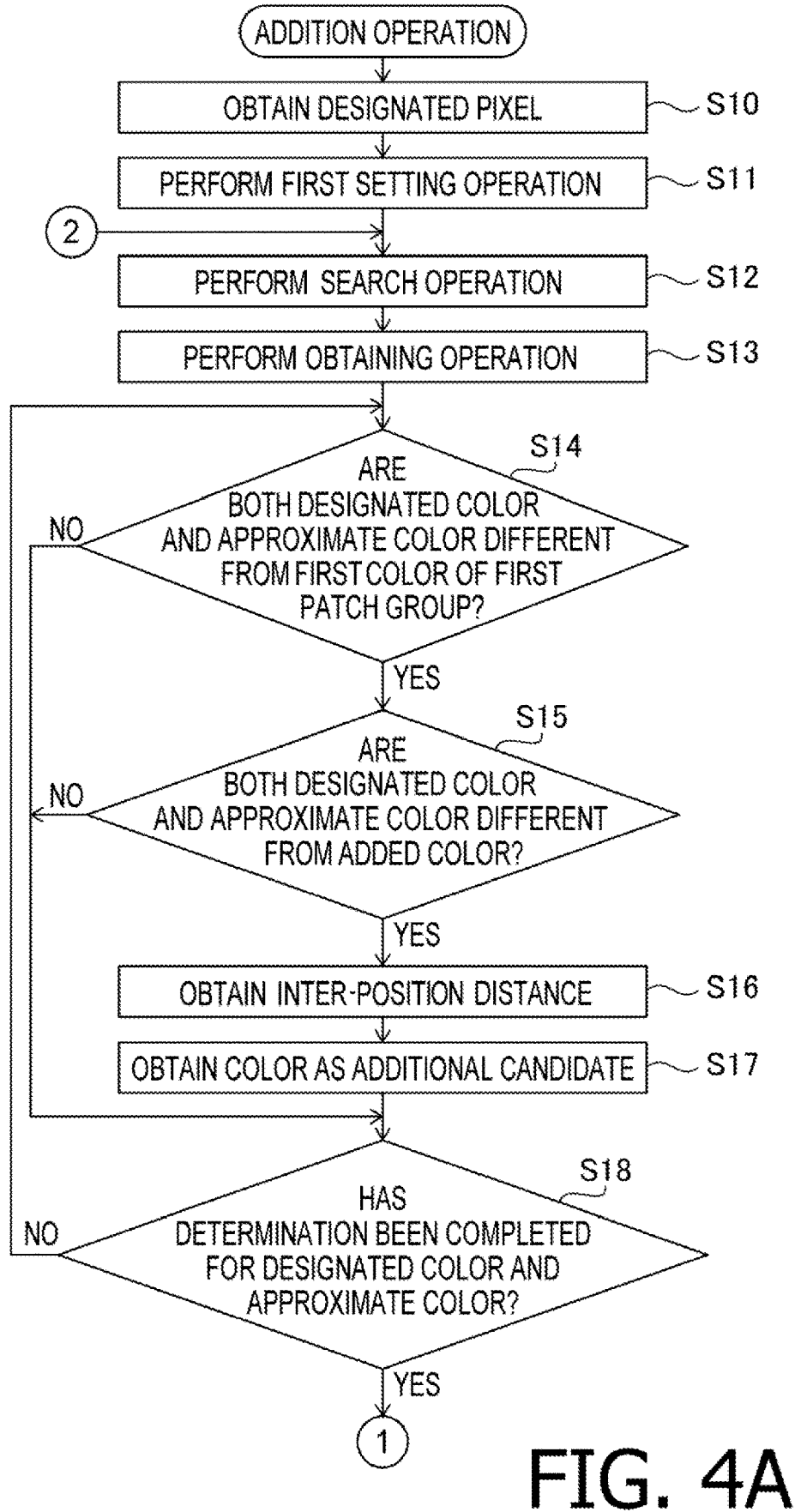
FIGS. 4A and 4B are a flowchart illustrating an example of an additional operation.
Figure 4B:
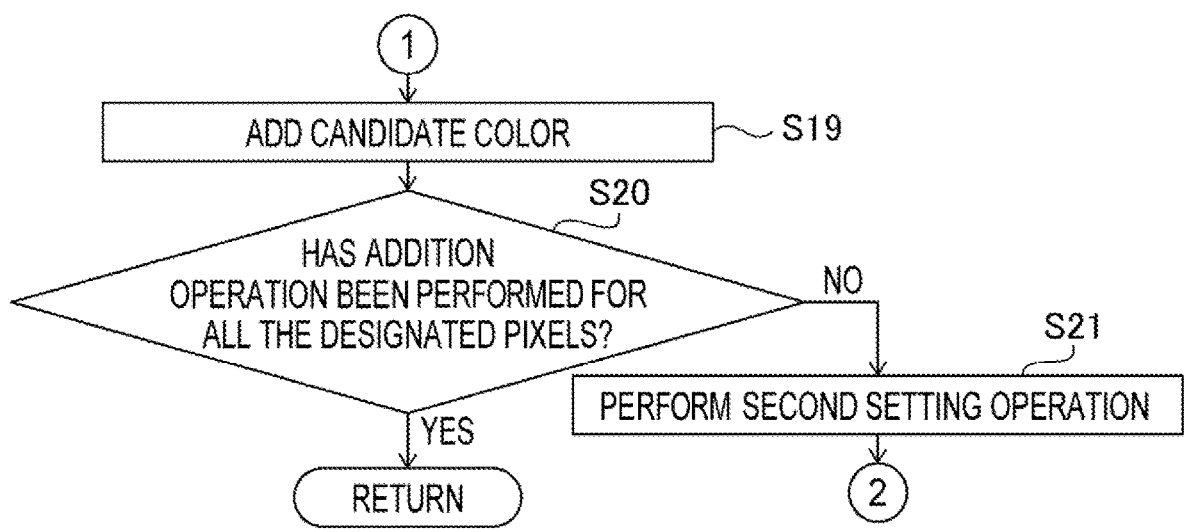
Figure 6:
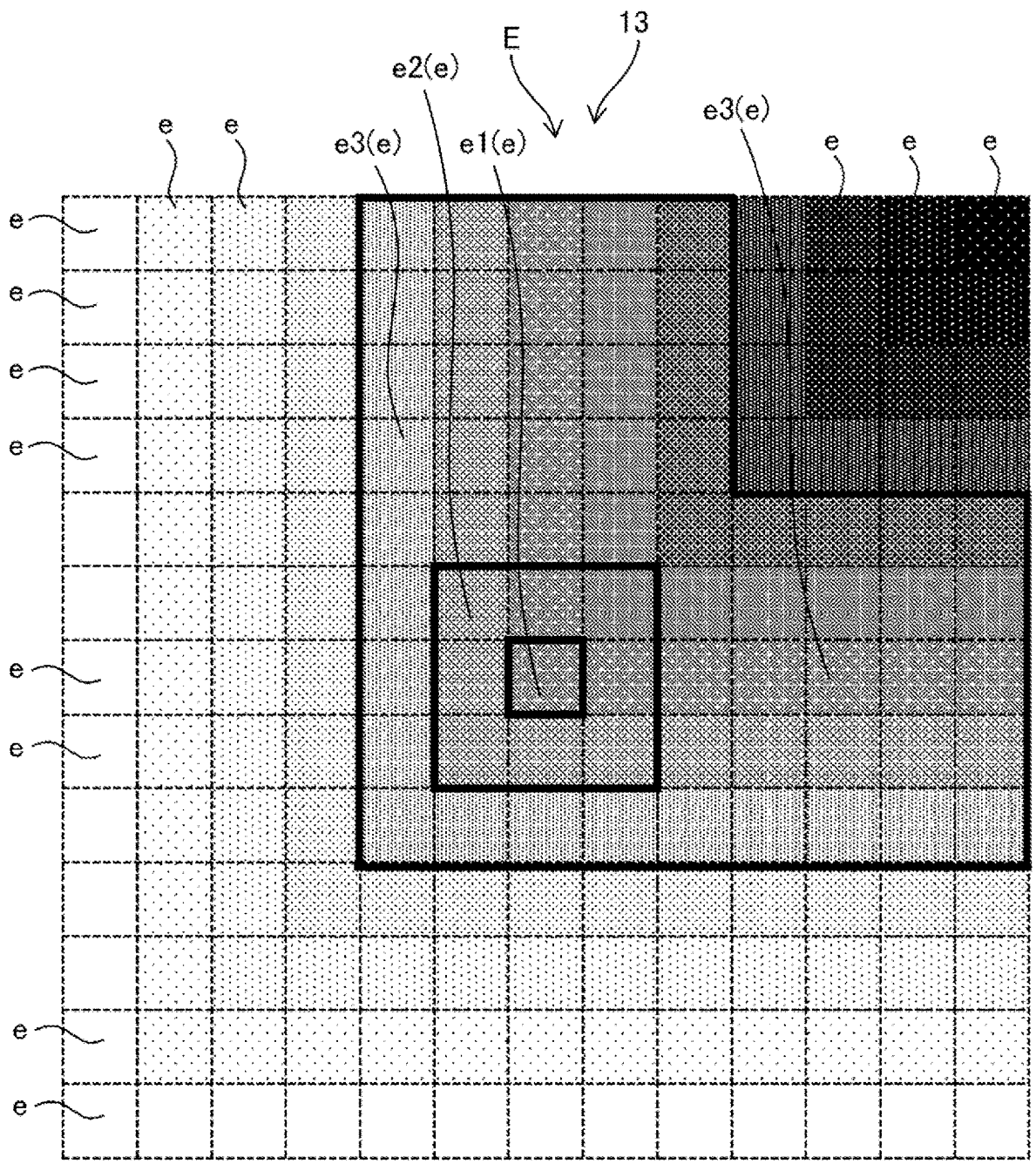
FIG. 6 shows a display on which an image is displayed.

FIGS. 4A and 4B shows an example of an addition operation. In S10, the controller 50 obtains the designated pixel e1 designated by the input device 14. As shown in FIG. 6, the controller 50 obtains image data to be printed and displays the image E on the display 13. The image E has a plurality of pixels e divided per unit area. A plurality of pixels e are aligned in the X direction and in the Y direction, which intersects (e.g., orthogonal to) the X direction, on the display 13 to form the image E. The position of pixel e is the X position of the pixel e aligned in the X direction and the Y position of the pixel e aligned in the Y direction in the image E. Alternatively, the position of pixel e may be represented by X and Y coordinates based on a particular position of the display 13.

The user specifies one or more pixels e to be used for color calibration in the image E displayed on the display 13 using the input device 14. The controller 50 obtains the position on the display 13 specified by the input device 14. The controller 50 sets the pixel e corresponding to the designated position as a designated pixel e1, and specifies its position in the X and Y directions, and the color value of the designated pixel e1, such as its RGB value, as a designated color in the candidate list shown in FIG. 8, and store the candidate list in the storage 53. When multiple designated pixels e1 are designated, a candidate list is generated for each designated pixel e1 and stored in the storage 53.

In S11, the controller 50 performs a first setting operation. In the first setting operation, the controller 50 sets the upper limit number of designated colors that can be added to the color list by the addition operation and the upper limit number of approximate colors of the designated colors according to the number of first colors contained in the first patch group B, the size of the patches, and the size of the print area A1 of the printing medium A. In other words, the controller 50 stores the number of first colors contained in the first patch group B, the size of the patches, and the upper limit number according to the size of the print area A1 of the printing medium A in the predetermined storage area of the storage 53. The patches include the first patch bn of the first patch group B and the second patch cm of the second patch group C.

The greater the number of patches, the more accurate the color calibration, but the more time and effort required for color calibration, etc. Therefore, the number of colors that can be added to the color list, which is a list of colors for patches, is limited in consideration of such factors. It is noted that the number of first colors in the first patch group B is determined in advance, e.g., 729, which is equal to the number of the first patches bn. The controller 50 obtains the size of the patch and the size of the print area A1 based on the conditions obtained in S1. The controller 50 calculates the quotient of the size of the print area A1 divided by the size of the patch as the total number of patches. The controller 50 calculates the number of second patches cm by subtracting the number of first patches bn from the total number of patches. The controller 50 calculates the quotient obtained by dividing the number of second patches cm by the number of designated pixels e1 as the upper limit number of designated colors and approximate colors per designated pixel e1.

In S12, the controller 50 performs a search operation. The search operation is included in the addition operation. In the search operation, the controller 50 searches for a color, which is a color of a pixel e located around the designated pixel e1 on the image E and that a color difference from the designated color is less than the threshold value. The pixels e located around the designated pixel e1 include a pixel e adjacent to the designated pixel e1 in the image E and a pixel e continuous with the designated pixel e1 via a pixel e having the color difference from the designated color in the image E that is less than the threshold value. In other words, there is no other pixel e between the designated pixel e1 and the pixel e adjacent to the designated pixel e1. There is no pixel e between the designated pixel e1 and a pixel e (an example of a contiguous pixel) that is contiguous to the designated pixel e1 via a pixel e of a color having the color difference from the designated color in the image E that is less than the threshold value. There is at least one pixel e between the designated pixel e1 and a pixel e that is contiguous with the designated pixel e1 via a pixel e of a color having the color difference from the designated color in the image E that is less than the threshold value.

Figure 7:
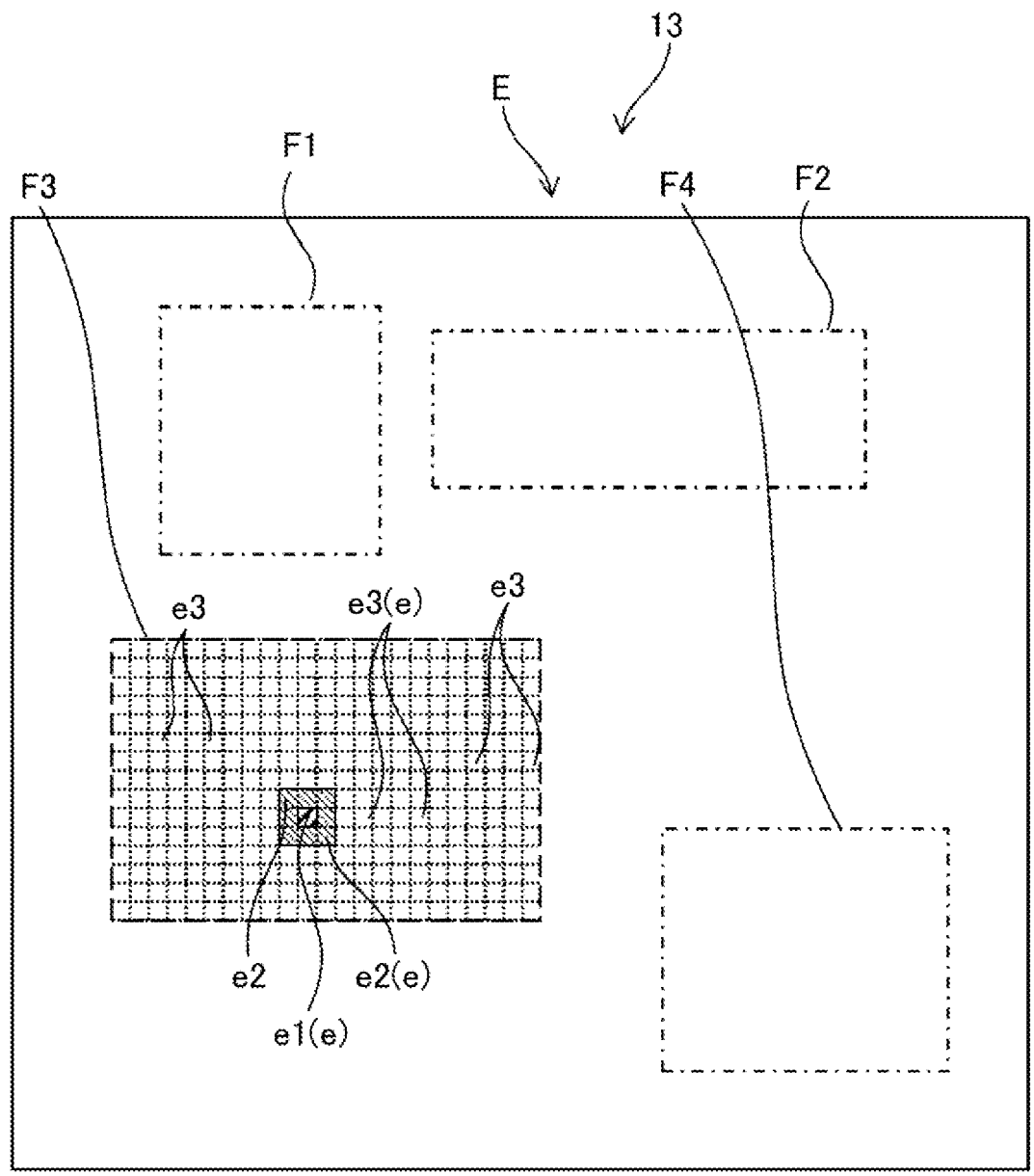
FIG. 7 shows the display on which another image is displayed.

FIG. 7 shows a concrete example of the searching operation performed in S12. As shown in FIG. 7, the controller 50 obtains from the image data the color value and position of pixel e in the image E in an associated manner. The controller 50 obtains the color difference between the color value of this pixel e and the designated color of the designated pixel e1 obtained in S10. The controller 50 searches for the colors of pixels e of which the color differences from the specified color are less than the threshold value, and extracts areas of the pixels e of that color, e.g., four areas F1, F2, F3, and F4. Each area is a closed space and contains one or more pixels e. The color difference between the color of the pixel e and the designated color is less than the threshold value and is approximate to the designated color. In an area that contains a plurality of pixels e, two pixels e are consecutively aligned in the X or Y direction. The controller 50 obtains F3 including the designated pixel e1 from the four areas F1, F2, F3, and F4.

The area F3 has a first surrounding pixel e2 and a second surrounding pixel e3, each of which is a pixel e located around the designated pixel e1 and of a color of which the color difference from the designated color is less than the threshold value. The first surrounding pixel e2 is a pixel e adjacent to the designated pixel e1 with no pixel e between the first surrounding pixel e2 and the designated pixel e1 in the X or Y direction. The second surrounding pixel e3 is located farther from the designated pixel e1 than the first surrounding pixel e2. In the X or Y direction, the first surrounding pixel e2 is arranged between the designated pixel e1 and the second surrounding pixel e3. Alternatively, the first surrounding pixel e2 and one or more second surrounding pixels e3 are arranged between the designated pixel e1 and the second surrounding pixel e3.

In S13, the controller 50 performs the obtaining operation. In the obtaining operation, the controller 50 obtains the color of the pixel e located around the designated pixel e1 in the image E and of which the color difference from the designated color is less than the threshold value, as the approximate color. In the example shown in FIG. 7, the controller 50 obtains the positions of the first surrounding pixel e2 and the second surrounding pixel e3 in the area F3, and the RGB values of the approximate colors from the image data and add the same to the candidate list shown in FIG. 8, in the columns of No. 1 or thereafter.

In S14, the controller 50 performs a first determination operation. In the first determination operation, the controller 50 determines whether both the designated color and the approximate color are different from the first color of the first patch group B. When the RGB value of only the designated color obtained in S10 matches the RGB value of the particular first color, the controller 50 determines that the designated color and the first color are the same (S14: NO). When the RGB value of only the approximate color obtained in step S13 matches the RGB value of the particular first color, the controller 50 determines that the approximate color and the first color are the same (S14: NO). On the other hand, when the designated color does not match the first color, the controller 50 determines that the designated color is different from the first color (S14: YES). Further, when the approximate color does not match the first color, the controller 50 determines that the approximate color is different from the first color (S14: YES).

When both the designated color and the approximate color are different from the first color (S14: YES), the controller 50 performs the second determination operation (S15). For example, when multiple designated pixels e1 are designated, the designated color of designated pixel e1 and the approximate colors of surrounding pixels e2 and e3 are added to the color list for each designated pixel e1. Therefore, when adding to the color list for the designated color of one designated pixel e1 among multiple designated pixels e1, at least one of the designated colors and the approximate colors of the other designated pixels e1 may have already been added to the color list. To avoid the same color being added to the color list more than once, the controller 50 determines in the second determination operation whether the designated color and the approximate color are different from the colors already added to the color list in the addition operation.

Concretely, in the second determination operation, when the RGB value of the designated color is the same as the RGB value of the second color of the second batch group C added to the color list, the controller 50 determines that the designated color and the second color of the color list are the same (S15: NO). On the other hand, when the designated color does not match the second color of the color list, the controller 50 determines that the designated color and the second color are different (S15: YES). Further, when the approximate color does not match the second color of the color list, the controller 50 determines that the approximate color and the second color are different (S15: YES).

As described above, the controller 50 performs the first determination operation in S14 and the second determination operation in S15 for each color of the designated color and the approximate color obtained in S13, respectively. Where the designated or approximate color is the same as the first or second color (S14: NO, and S15: NO), for the pixel e of that color, the controller 50 adds "-" to the priority level in the candidate list in FIG. 8, and remove this pixel e from the candidate list. Then, the controller 50 determines whether determination has been completed for the designated color and its approximate color (S18). When the determination has not been completed for the designated color and its approximate color (S18: NO), the controller 50 returns to S14 and performs subsequent processes.

When both the designated color and the approximate color are different from the second color in the color list (S15: YES), as shown in the example in FIG. 8, the controller 50 obtains the inter-position distance which is a distance between the positions of the designated pixel e1 of the designated color and the surrounding pixels e2, e3 of the approximate color of the designated color (S16). The controller 50 then obtains the designated color and approximate color as additional candidates and adds them to the candidate list (S17). Then, the controller 50 repeats steps S14-S17 are repeated until the determination is completed for the specified color and its approximate color.

When the determination is completed for the designated color and its approximate colors (S18: YES), the controller 50 adds the upper limit number of colors among the candidate colors to be added to the color list in order of priority (S19). The controller 50 sets the order of the designated colors to be added to the color list before the approximate colors, and adds the designated colors to the color list in priority to the approximate colors. Furthermore, when multiple approximate colors are obtained by the obtaining operation, the controller 50 performs an addition operation to select, among the approximate colors of the surrounding pixels e2, e3 corresponding to the multiple approximate colors, the approximate colors of the surrounding pixels e2, e3 that are closer to the designated pixel e1 is added to the color list in priority. In other words, the shorter the inter-position distance between the position of pixel e and the position of designated pixel e1 in the image E, the higher the priority of adding the pixel e to the color list, thereby the adding order being set to earlier order. Therefore, colors falling within a range exceeding the upper limit number of candidate colors to be added will not be added to the color list. In other words, the farther away from the position of the designated pixel e1 in the image E, the lower the controller 50 sets the priority of adding the pixel e to the color list. As a result, when the number of candidate colors to be added exceeds the upper limit, the pixel e at the position with a large inter-position distance from the position of the designated pixel e1 in the image E is not added to the color list.

In the candidate list in FIG. 8, the pixel e in No. 0 is the designated pixel e1, and the distance to the designated pixel e1 is 0. The priority of this designated pixel e1 is 1. The pixel e in No. 1 is the first surrounding pixel e2 adjacent to the designated pixel e1, and the distance from the designated pixel e1 is 1. This first surrounding pixel e2 is closer to the designated pixel e1 than the second surrounding pixel e3. However, since the approximate color of the first surrounding pixel e2 is either the same color as the first color or the same color as the color already added to the color list, the approximate color of the first surrounding pixel e2 has been removed as a candidate for addition.

No. 2 pixel e and No. 3 pixel e are the designated pixels e2 and e3 between the surrounding pixels e1 and the second surrounding pixel e3, and the distance from the designated pixel e1 is more than 2. The inter-position distance of the No. 3 second surrounding pixel e3 is 4, which is shorter than the inter-position distance of the No. 2 second surrounding pixel e3. Therefore, the controller 50 sets the priority of the No. 3 second surrounding pixel e3 to 2, which is higher than the priority of the No. 2 second surrounding pixel e3, and the priority of the No. 3 second surrounding pixel e3 is set to 3. In other words, in the candidate list in FIG. 8, the controller 50 stores that the priority of the No. 3 second surrounding pixel e3 is 2, which is higher than the priority of the No. 2 second surrounding pixel e3, and stores the priority of the No. 3 second surrounding pixel e3 as 3 in the storage 53.

As described above, the number of second colors added to the color list is less than or equal to the upper limit number set by the first setting operation. Further, the second color is the color between the two first colors, and is the color contained in the image E. The second color contains the designated color of the designated pixel e1, which is designated by the user, and the approximate colors of the surrounding pixels e2 and e3 of the designated pixel e1.

The controller 50 determines whether or not the addition operation has been performed for all the designated pixels e1 designated in step S10 (S20). When there remains designated pixels e1 for which no addition operation has been performed (S20: NO), the controller 50 performs the second setting operation (S21). In the second setting operation, when a plurality of designated pixels e1 including the first designated pixels e1 are designated by the input device 14, the controller 50 sets the upper limit number of designated colors and approximate colors to be added to the color list by the addition operation with respect to the first designated pixels e1 according to the number of the designated colors and the number of the approximate colors added to the color list by the addition operation performed prior to the addition operation with respect to the first designated pixels e1 of the plurality of designated pixels e1. In other words, the controller 50 stores the upper limit number corresponding to the number of designated colors and the approximate colors added to the color list by the addition operation performed prior to the addition operation with respect to the first designated pixels e1 among the plurality of designated pixels e1 in a particular storage area of the storage 53.

Concretely, the upper limit number of the designated colors and the approximate colors to be added as the second color to the color list is set for each designated pixel in the first setting operation in S11. In contrast, there is a case where the number of approximate colors obtained in S13 may be small. Further, there is a case where the number of colors among the designated and specified colors that are determined to be the same as the first color in S14 and the number of colors that are determined to be the same as the first color in S15 are relatively large. In such a case, there may be a case where the number of designated colors and their approximate colors added in S19 is less than the upper limit number. Therefore, in order to prevent the number of the second color from being low, the controller 50 resets the upper limit number by the second setting operation.

In the second setting operation, the controller 50 calculates the number of second patches cm by subtracting from the total number of patches the number of first patches bn and the number of additional designated and approximate colors in step S17. The controller 50 calculates the quotient of the number of second patch cm divided by the number of remaining designated pixels e1 as the upper limit number of designated and approximate colors for each designated pixel e1. The controller 50 then stores the calculated upper limit number in a particular storage area of the storage 53.

For example, suppose that five designated pixels e1 are designated in S10. The controller 50 sets the upper limit number of designated pixels e1 for the first designated pixel e1 out of the five designated pixels e1 in the first setting operation (S11), and then performs the processes of S12-S20. Then, the controller 50 calculates the upper limit number of the designated and approximate colors of the second designated pixel e1 by obtaining a difference by subtracting the addition number of the first designated pixel e1 in S19 and the number of the first patches bn from the total number of the patches, and then obtaining the quotient of the difference divided by the remaining number of the designated pixels e1 (i.e., 4).

The controller 50 performs processes of S12-S20 for the second designated pixel e1. Then, the controller 50 calculates the upper limit number of the designated and approximate number of the third designated pixel e1 by obtaining a difference by subtracting the addition number of the first designated pixel e1, the addition number of the second designated pixel 31, and the number of the first patches bn from the total number of the patches, and then obtaining the quotient of the difference divided by the remaining number of the designated pixels e1 (i.e., 3) in S21. Similarly to the second designated pixel e1, the controller 50 performs S12-S21 for the third and fourth designated pixels e1. Then, the controller 50 performs S12-S20 for the last (i.e., fifth) designated pixel e1. Here, since the controller 50 has performed the addition operation for all the designated pixels e1 (S20: YES), the process returns to S4 of the flowchart shown in FIG. 3.

Figure 5:
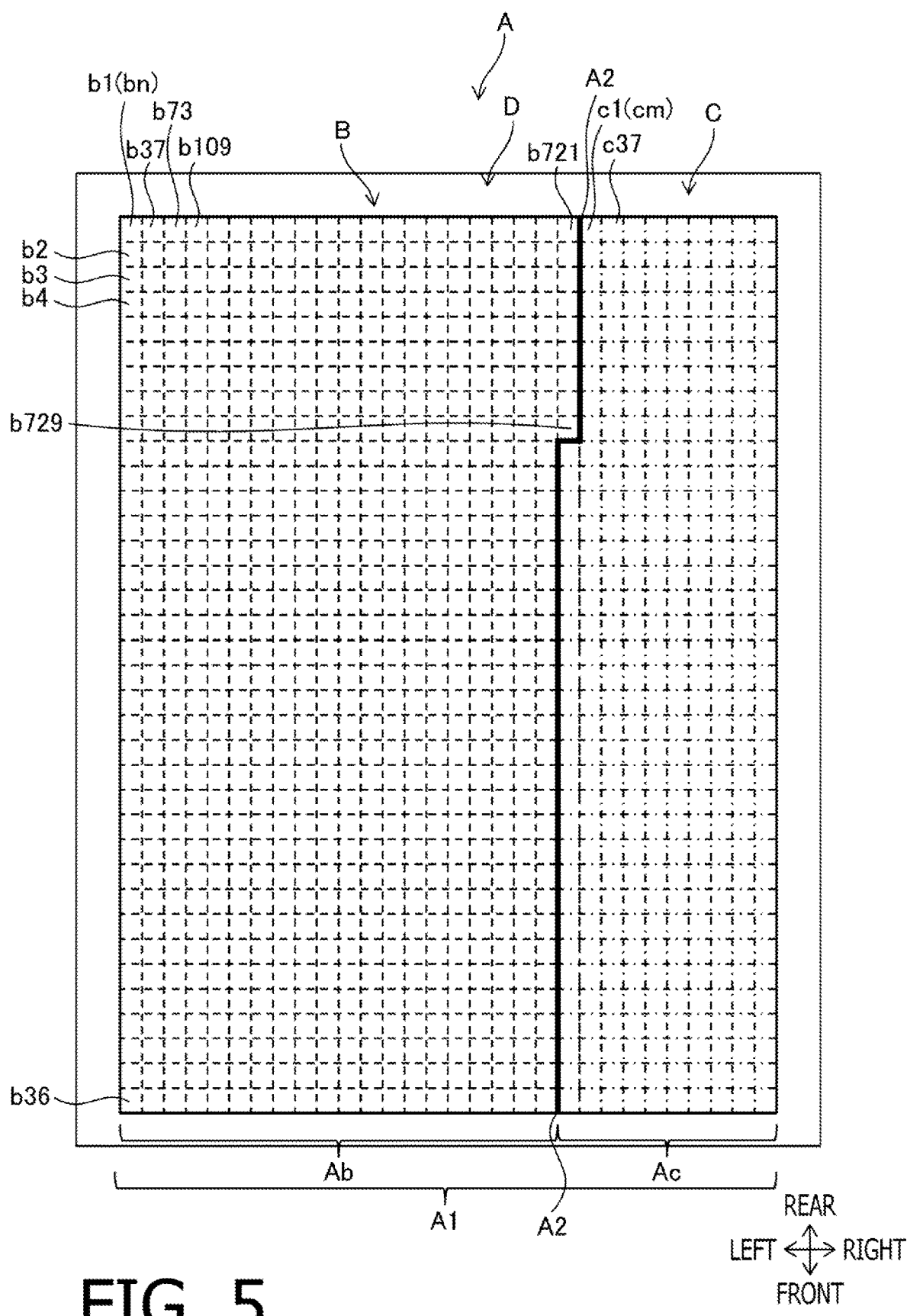
FIG. 5 is a top view of a printing medium on which a patch chart has been printed.

The controller 50 performs the printing operation of a patch chart D (step S4). Concretely, as shown in an example shown in FIG. 5, the patch chart D is an image representing patches of colors in the color list, and includes a plurality of first patches bn of the first patch group B, and a plurality of second patches cm of the second patch group C.

For example, the first color of the first patch group B and the second color of the second patch group C are defined by RGB values. In contrast, the printing device 10 is configured to perform printing with the four colors of CMYK inks. In such a configuration, the controller 50 reads the RGB values of the first and second colors from the storage 53, and converts these RGB values to CMYK values in the CMYK color space, which is the color space on which the printing device 10 depends, based on a particular correspondence relationship, such as an ICC profile. Then, the controller 50 obtains the image data of the patch chart D based on the CMYK values and the size of the patch, and prints the patch chart D on the print area A1 of the printing medium A based on the image data. In this way, the first patch group B and the second patch group C are printed on the same print medium A in the patch chart D corresponding to the color list.

The printing medium A on which the patch chart D is printed has a first area Ab on which the first patch group B is printed, and a second area Ac on which the second patch group C is printed. For example, in the print area A1, a boundary line A2 is provided between the first area Ab and the second area Ac. The boundary line A2 extends in the front-rear direction. The boundary line A2 may be bent right or left in part, as in the example shown in FIG. 5. This right-left extension corresponds to a right-left length of one patch.

The first area Ab is located on the left with respect to the boundary line A2, and the second area Ac is located on the A2 with respect to the boundary line A2. The first area Ab is an area that contains all the first patches bn in the first patch group B and is a closed area. The second area Ac is the area that contains all the second patches cm in the second patch group C and is a closed area. As described above, the print area A1 has one boundary line A2, one first area Ab, and one second area Ac. In the first area Ab, a plurality of first patches bn are aligned in the right-left and front-rear directions. In the second area Ac, a plurality of second patches cm are aligned in the right-left and front-rear directions. In the print area A1, the rows of the plurality of first patches bn aligned in the right-left direction and the rows of the plurality of second patches cm are aligned on the same lines, respectively, in the print area A1.

The controller 50 obtains the colorimetric values of the first color of the first patch bn printed on the print medium A and the second color of the second patch cm measured by the colorimeter 15 (S6). The colorimetric values are expressed, for example, as Lab values. The Lab value is a color value that is a coordinate value in the device-independent L*a*b* color space, where L represents brightness, and a and b are Cartesian coordinates for hue and saturation, respectively. The controller 50 stores the RGB values of the first color of the first patch bn and the second color of the second patch cm and the Lab values, i.e., the colorimetric values thereof in the color list in an associated manner.

The controller 50 interpolates the first color in the color gamut of the printing device 10 (S7). For example, the first color in the color list is the RGB values in 32 increments and the Lab values corresponding to the RGB values. For this reason, the controller 50 obtains RGB values for the color gamut of the printing device 10 in increments smaller than the first color increment value of 32 increments, e.g., 16 increments. These 16 increments of RGB values have $(256/16+1)^3 = 4913$ different colors, with 729 kinds of first color RGB values in 32 increments, and the 16 increments of RGB values have interpolated color RGB values, which are the 4184 different colors between the first color RGB values.

The second color is the color between the two first colors and is therefore used for m kinds of interpolating colors out of 4184 kinds of interpolating colors. However, when the RGB values of the second color are different from the RGB values of the 16 increments, the controller 50 extracts the RGB values of the interpolated color that are closest to the RGB values of the second color, reflects the Lab values of the RGB values of the second color to the RGB values, and adds the RGB values to the color list. The controller 50 obtains the Lab values based on the correspondence between the RGB values of the first and second colors and the Lab values as the Lab values corresponding to the RGB values of the remaining (4184−m) kinds of interpolated colors and adds the same to the color list. The color list thereby includes the correspondence between the RGB values and Lab values of the first color, the correspondence between the RGB values and Lab values of the second color, and the correspondence between the RGB values and Lab values obtained based on the first and second colors.

The controller 50 performs a generating operation (S8). In the generating operation, the controller 50 generates a color calibration profile to convert the color of the image data into the color of the image E to be printed by the printing operation in such a manner that the color of image E becomes the target color. Here, the target color is the color input to the controller 50 from the input device 14 and the external device 60, which may be, for example, the color displayed on a computer display, and may be the Lab values corresponding to the RGB values. For example, the user may input the Lab values corresponding to the RGB values of the target color of the image E to be printed by the printing device 10 via the input device 14, and the controller 50 may obtain the Lab values of the target color from the input device 14. The external device 60 may be another output device that is different from the printing device 10, such as a display and a printer. The controller 50 may obtain the Lab values corresponding to the RGB values of the target color from the external device 60 via the interface 51.

Concretely, the controller 50 generates a conversion table of the RGB values for converting from the RGB values of the printing device 10 to the RGB values of the target color in such a manner that the Lab values of the target color and the Lab values of the printing device 10 in the color list obtained in S7 are consistent with each other. Furthermore, when the ink colors used by the printing device 10 in printing are cyan, magenta, yellow, and black, the controller 50 generates a color calibration profile, which is a conversion table that converts the RGB values of the target color in the RGB value conversion table to CMYK values based on the predetermined correspondence relationship, and stores the color calibration profile in the storage 53. In this color calibration profile, the RGB values of the image data, which correspond to the RGB values of the printing device 10, are associated with the CMYK values of the printing device 10 in such a manner that the color of image E printed by the printing operation is the target color.

When the printing device 10 prints the image E based on the image data, the controller 50 converts the RGB values of the image data to the CMYK values of the printing device 10 based on the color calibration profile. The controller 50 then prints the image E on the printing medium A based on the CMYK values of the converted image data. In this way, the color of the image E printed by the printing device 10 can be matched to the target color. For example, it is possible to make the color of the image E printed by printing device 10 based on the color-calibrated image data match the color of the image E printed by the other printing device based on the same image data.

Effects

In the printing device 10, the controller 50 is configured to perform the printing operation to print, on the same printing medium A, the first patch group B containing a plurality of patches, and the second patch group C containing patches corresponding to the designated pixel e1 designated via the input device 14 and containing a pair of patches of which the color difference is smaller than the pair of patches of the first patch group B having the smallest color difference. According to this configuration, the color of the image data is calibrated based on the colorimetric values of the printed first patch group B and second patch group C. This second patch group C has a smaller color difference between patches than the first patch group B, and also includes patches corresponding to the designated pixel e1 by the user. Therefore, it is possible to improve the color calibration of the image E with small color differences between pixels E, while taking into account the color designated by the user.

In the printing device 10, the printing medium A has a first area Ab on which the first patch group B is printed and a second area Ac on which the second patch group C is printed. According to this configuration, the user can easily check the second patch group C for color calibration in the second area Ac.

In the printing device 10, the controller 50 is configured to perform the addition operation to add the second patch group C to the color list and the generating operation to generate a color calibration profile based on the color list to calibrate the color of the image data in such a manner that the color of the image E is the target color. According to this configuration, for example, the color of the image data is calibrated by a color calibration profile based on a color list that includes the designated color of the designated pixel e1 with a small color difference. By printing image E based on this color-calibrated image data, the image E can be printed in the target color.

In the printing device 10, the addition operation includes the search operation, which searches for a color of pixels e located around the designated pixel e1 in the image E and of which the color differences from the designated color are less than the threshold value. According to this configuration, by adding, to the color list, the colors of the pixels e surrounding the designated pixel e1 that have small color differences from the designated color, thereby color calibration of image E being performed taking into account the colors surrounding the designated pixel e1.

In the printing device 10, the pixels e located around the designated pixel e1 include the pixel e adjacent to the designated pixel e1 in the image E, and a pixel that is contiguous with the designated pixel e1 via the pixel e of which the color differences from the designated pixel e1 is less than the threshold value in the image E. According to this configuration, a color with a small color difference from the designated color and a coherent range of colors around the designated pixel e1 can be accurately extracted and added to the color list for the colors in the surrounding range of the designated pixel e1, thereby enabling color calibration of the image E taking into account the colors around the designated pixel e1.

In the printing device 10, after the search operation, the controller 50 performs the obtaining operation to obtain the color of the pixel e located around the designated pixel e1 in the image E and of which the color difference from the designated color is less than the threshold value as the approximate color, and the determination operation to determine, in the addition operation, whether or not the designated color and the approximate color are different from the color of the first patch group B. In the addition operation, among the designated colors and approximate colors, a color that is different from the color of the first patch group B is added to the color list. According to this configuration, as many colors as possible that differ from the color of the first patch group B can be added to the color list, thereby improving the color calibration based on the color list.

In the printing device 10, the controller 50 performs, after the search operation, the obtaining operation to obtain, as an approximate color, the color of a pixel e located around the designated pixel e1 in the image E and of which the color difference from the designated color is less than the threshold value. When multiple approximate colors are obtained by the obtaining operation, the controller 50 adds, in the addition operation, the approximate color of the pixel e that is closer to the designated pixel e1 is added to the color list in priority among the pixels e that correspond to the multiple approximate colors. According to this configuration, the color calibration can be improved by taking into account the surrounding colors close to the designated pixel e1 by the user.

In the printing device 10, the controller 50 performs the first setting operation to set the upper limit number of designated colors and approximate colors to be added to the color list by the addition operation according to the number of colors contained in the first patch group B, the size of the patch, and the size of the print area A1 of the printing medium A. According to this configuration, the more colors added to the color list, the better the color calibration. However, the number of printing media A on which the patch chart D are printed according to the color list and the number of patches to be printed increase, requiring more time and effort for color calibration. Therefore, by setting the upper limit number of colors to be added, an appropriate balance can be taken between the improvement of color calibration and the time and effort required for the color calibration process.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications

In the example shown in FIG. 7, in the search operation, the controller 50 obtains the area of pixel e in the image E for which the color difference from the designated color is less than the threshold value among the pixels e in the image E, extracts the area including the designated pixel e1 from that area, and the color of the pixel e in that area is used as the approximate color. In contrast, as in the example in FIG.

9, the controller 50 may, in the direction away from the designated pixel e1, obtain pixels for which the color differences from the designated color are less than the threshold value e, and the colors of the pixels e may be used as the approximate colors.

Figure 9A:
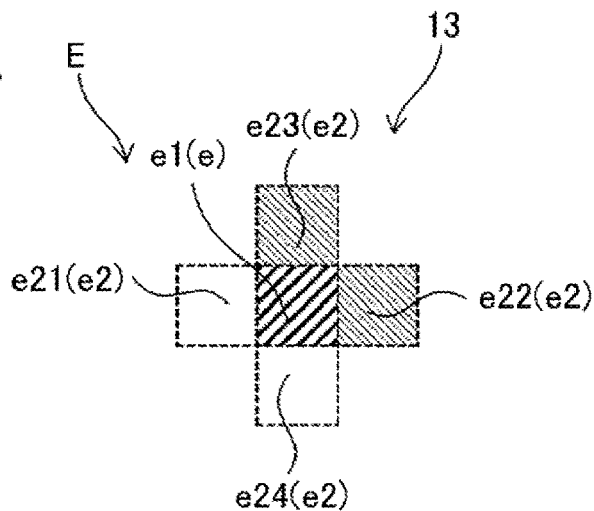
FIGS. 9A-9C illustrate pixels of an image illustrating a searching operation.

Concretely, as shown in FIG. 9A, the controller 50 obtains the designated color of the designated pixel e1 designed by the input device 14 in the image E displayed on the display 13. For each of four first surrounding pixels e2 (i.e., e21-e24) adjacent to the designated pixel e1 in X and Y directions, the controller 50 obtains the color from the image data. The controller 50 obtains the color of the first surrounding pixel e2 of the four first surrounding pixels e2 of which the color difference from the designated color is less than the threshold value as the approximate color. For example, among the four first surrounding pixels e21 to e24, when the color differences of the first surrounding pixels e22 and e23 from the designated color are less than the threshold value, the colors of the first surrounding pixels e22 and e23 are obtained as the approximate colors.

Figure 9B:
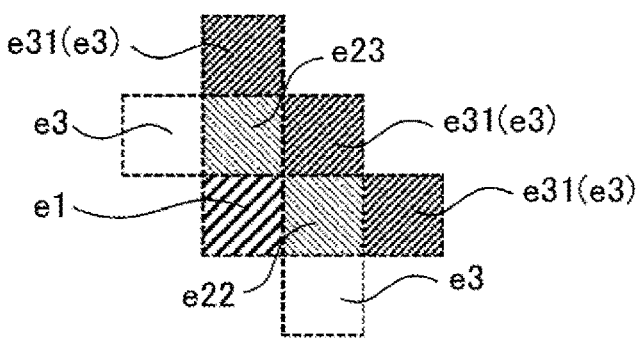

Then, as shown in FIG. 9B, the controller 50 obtains the colors of the four pixels e adjacent to the first surrounding pixel e22 and the four pixels e adjacent to the first surrounding pixel e23 from the image data. The controller 50 obtains pixels e of which the color differences from the designated color are less than the threshold value, respectively, from among the adjacent pixels e. The controller 50 obtains colors of the second surrounding pixels e3 which are pixels e other than the designated pixels e1 or the designated pixels e2 from among the pixels e as the approximate colors. For example, the colors of three second surrounding pixels e31 of the second surrounding pixels e3 are obtained as the approximate colors.

Figure 9C:
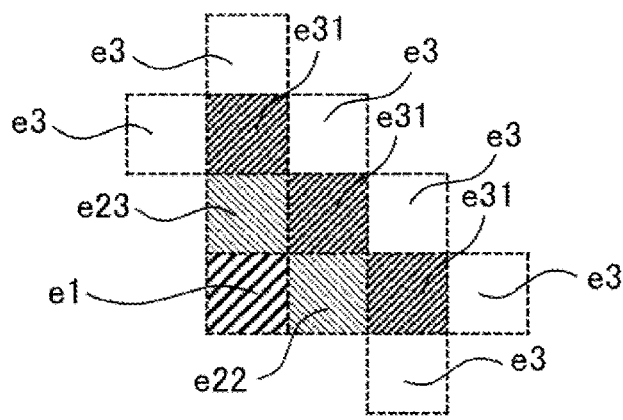

Then, as shown in FIG. 9C, the controller 50 obtains the colors of four pixels e adjacent to each of the three second surrounding pixels e31 from the image data. The controller 50 obtains the pixels e from among the adjacent pixels e of which the color differences from the designated color are less than the threshold value. Then, the controller 50 obtains colors of the second surrounding pixels e3 which are pixels e other than the designated pixels e1 or the first surrounding pixels e2 as the approximate colors.

As described above, the controller 50 is configured to repeat the processes of searching, in order, for the color of the pixel e of which the color difference from the designated color is less than the threshold value among the pixels e adjacent to each pixel e of the designate pixel e1, the first surrounding pixel e2 and the second surrounding pixel e3 in the image E, and obtain the color of the pixel e as the approximate color. According to this configuration, by expanding one closed range of approximate colors centered on the designated pixel e1, the colors of pixels e with small color differences, such as colors having gradation, can be added to the color list. Therefore, it is possible to improve the color calibration of image E with small color differences between the pixels e.

All of the above-described configurations may be combined with each other as long as they do not exclude each other's configurations. Furthermore, from the above description, many improvements and other embodiments of the present embodiment are obvious to those skilled in the art. Accordingly, the above description should be construed as an example only and is provided for the purpose of disclosing to those skilled in the art the best mode of carrying out the invention. The details of its structures and/or functions can be substantially modified without departing from aspects of the present disclosures.

What is claimed is:

1. A printing device, comprising:
a head configured to print an image having a plurality of pixels on a printing medium based on image data;
an input device configured to obtain an input of designating a pixel of the image; and
a controller;
wherein the controller is configured to cause the printing device to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

2. The printing device according to claim 1,
wherein the printing medium has a first area and a second area, the first patch group being printed on the first area, the second patch group being printed on the second area.

3. The printing device according to claim 1, further comprising a storage configured to store a color list including a color of the first patch group,
wherein the first patch group including a plurality of the patches, color differences among the plurality of the patches in the first patch group are equal to or greater than a particular threshold,
wherein the second patch group including the patch of a designated color and the patch of an approximate color, the designated color being a color of the designated pixel, the approximate color having a color difference less than the particular threshold from the designated color, and
wherein the controller is configured to perform:
adding a color of the second patch group to the color list; and
generating a color calibration profile to convert a color of the image data into a color of the image to be printed.

4. The printing device according to claim 3,
wherein the adding includes searching for a color of pixels located around the designated pixel in the image, color difference between the color searched in the searching and the designated color being less than the particular threshold.

5. The printing device according to claim 4,
wherein pixels located around the designated pixel include a pixel adjacent to the designated pixel in the image, and a contiguous pixel contiguous with the designated pixel via a pixel having the color difference less than the particular threshold from the designated pixel in the image.

6. The printing device according to claim 4,
wherein, after performing searching, the controller is configured to perform:
obtaining, as the approximate color, at least one of:
a color of the pixel located around the designated pixel in the image; and
a color of a contiguous pixel contiguous with the designated pixel via the pixel having the color difference less than the particular threshold from the designated pixel in the image, the color difference of the color of the contiguous pixel from the designated pixel being less than the particular threshold;

determining, in the adding, whether the designated color and the approximate color are different from a colors of the first patch group; and adding, in the adding, among the designated color and the approximate color, a specific color, the specific color being different from the color of the first patch group to the color list.

7. The printing device according to claim 4, wherein, after performing searching, the controller is configured to perform:

obtaining, as an approximate color, at least one of:
- a color of the pixel located around the designated pixel in the image; and
- a color of a contiguous pixel contiguous with the designated pixel via the pixel having the color difference less than the particular threshold from the designated pixel is in the image, the color difference of the color of the contiguous pixel from the designated pixel being less than the particular threshold; and when obtaining a plurality of the approximate colors in the obtaining, adding, in the adding, among pixels corresponding to the plurality of the approximate colors, the approximate color of a pixel closer to the designated pixel to the color list in priority.

8. The printing device according to claim 3, wherein, after performing searching, the controller is configured to perform first setting an upper limit number of designated colors and approximate colors to be added to the color list by the adding according to a number of colors contained in the first patch group, a size of the patch, and a size of a print area of the printing medium.

9. The printing device according to claim 8, wherein, when a plurality of the designated pixels including a first designated pixel are designated by the input device, the controller is configured to perform second setting an upper limit number of designated colors and approximate colors to be added to the color list by the adding with respect to the first designated pixels according to the number of the designated colors and the number of the approximate colors added to the color list by the adding performed prior to the adding with respect to the first designated pixels of the plurality of designated pixels.

10. A control method of controlling a printing device, the printing device having a head configured to print an image having a plurality of pixels on a printing medium based on image data, and an input device configured to obtain an input of designating a pixel of the image, wherein the control method comprising causing the printing device to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

11. A non-transitory computer-readable recording medium for a computer, the computer having a head configured to print an image having a plurality of pixels on a printing medium based on image data, and an input device configured to obtain an input of designating a pixel of the image, the non-transitory computer-readable recording medium containing computer-readable instructions causing, when executed by a controller of the computer, the computer to print, on a same printing medium, a first patch group containing a plurality of patches, and a second patch group containing patches corresponding to the designated pixel designated via the input device, the second patch group containing a pair of patches, a color difference of the pair of patches contained in the second patch group being smaller than a color difference of a pair of patches with a smallest color difference among the plurality of patches contained in the first patch group.

* * * * *